Oct. 6, 1953     T. W. NICHOLS     2,654,532
ROTARY COMPRESSOR
Filed April 27, 1948
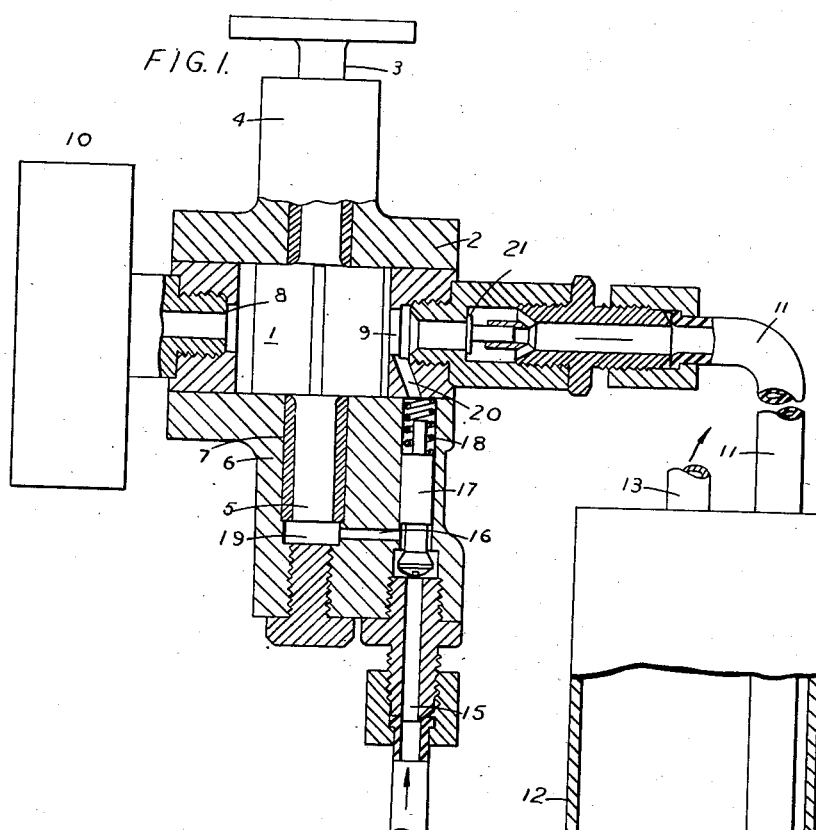
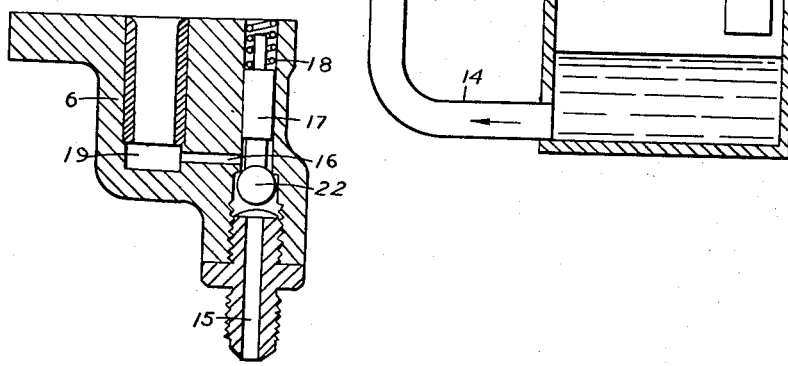
Inventor
Thomas W. Nichols
By
Attorney Patented Oct. 6, 1953

2,654,532

UNITED STATES PATENT OFFICE 2,654,532

ROTARY COMPRESSOR

Thomas Winter Nichols, Hutton, England

Application April 27, 1948, Serial No. 23,497
In Great Britain October 30, 1946

4 Claims. (Cl. 230—205)

This invention relates to rotary compressors of the kind in which a rotary compressor is sealed with oil from a combined air or gas and oil container.

Oil sealed rotary compressors with the sealing oil supplied under pressure from a combined air or gas and oil container have a tendency to flood with oil when stopped.

On restarting all the oil must be evacuated from the compressor, and this involves the use of shaft torque in excess of what should be necessary, and often entails the use of a motor of more than necessary power.

This defect is inherent in the type of compressor and is not connected with the use to which it is put.

To remedy this defect I propose to incorporate in a rotary compressor of this type an automatic valve or choke which will prevent the passage of sealing oil into the compressor immediately the compressor is stopped.

This automatic prevention of the flow of sealing oil to the compressor from the container may be achieved in various ways one of which will now be described by way of example only with reference to the accompanying drawings in which:

Fig. 1 shows a plan view partly in section of an air compressor fitted with an oil choke valve according to the invention and also shows an elevation partly in section of an associated air and oil container.

Fig. 2 shows a modification form of oil choke valve.

A rotary air or gas compressor of the vane type has a rotor 1 with one or more sliding vanes. The rotor is mounted eccentrically in a stator casing 2 and is arranged to be driven by an electric or other motor by a shaft 3 passing through a stuffing box 4 on the casing.

The shaft 5 of the rotor opposite the driving shaft is extended into an extension of the casing 6 and runs in a suitable bush 7.

Inlet and outlet passages 8, 9 for the air or gas are arranged in suitable parts of the casing and are threaded for the attachment of inlet and discharge pipes, non-return valves being fitted to the inlet and discharge lines, a filter 10 for the air inlet may be fitted as shown.

The discharge pipe 11 is led to a combined air or gas and oil container 12 and is preferably brought down to within a short distance of the surface of the oil contained therein.

The air or gas outlet 13 from the container is preferably located near the top so as to allow maximum separation of oil from the air or gas before discharge.

An oil outlet 14 from the bottom of the container is led to a sealing oil inlet 15 on the compressor casing. From the inlet the sealing oil is admitted to the bearings and bore of the compressor through a suitable port or ports 16.

It will be apparent that, with apparatus as so far described, upon stopping the compressor sealing oil will be forced through the bearing 7 of the extended shaft 5 under residual pressure in the container 12 and will eventually substantially flood the stator casing of the compressor with oil.

To overcome the disadvantages caused by such flooding it is proposed to insert a valve or choke in the sealing oil supply line to the compressor, preferably situated within the compressor casing. This valve may comprise a piston 17 the outer end of which may be arranged to act as a valve, whilst the inner end is adapted to engage a suitable spring 18. The sealing oil is led to the head of the valve through the sealing oil connection 15. A small port 16 connects with the underside of the valve and a chamber 19 at the outer end of the extended rotor shaft 5. This chamber connects with suitable ports (not shown) to lubricate the bearings at either side of the rotor and also passes the oil for sealing the bore of the compressor. A further small port 20 connects the inner end of the piston valve with the delivery port 9 of the compressor.

The action of this piston valve is as follows:

Assume that the compressor is at rest and that the piston valve has been forced inwards on to its seat. On the apparatus restarting the compressor raises the pressure in the delivery port 9 to the pressure required in the air or gas container 12. This pressure acting on the inner end of the piston and valve with the additional pressure due to the spring 18, being greater than the pressure in the container forces the valve outwards and permits the passage of the oil through the oil delivery port 16 to the chamber 19 from which chamber the sealing oil passes to the bore of the compressor and/or bearings and continues to pass thereto all the time the compressor is running.

On the apparatus being stopped, the suction valve (not shown) and the delivery surge valve 21 immediately seat themselves. The small amount of gas, at the same pressure as that in the container which is imprisoned in the delivery passage immediately leaks back to the suction side of the bore of the compressor. The pressure of the gas acting on the inner end of the piston 17 is therefore considerably reduced, so that the pressure on the outer end of the valve which is the same as that in the container, is greatly in excess of the pressure acting on the inner end of the valve causing the valve to be forced inwards, closing the valve and preventing the further passage of the sealing oil to the compressor.

The type of valve used to perform the described operation for preventing the passage of sealing oil to the compressor after it has stopped may be varied as preferred.

For example, the valve may be separate or (as shown in Fig. 2) a ball 22 may be used for the valve having a piston to push it off its seat on the starting of the apparatus. In this case the operation of choking the oil passage is exactly similar to that already described.

Modifications to the assembly and position of the parts may be arranged to meet requirements as preferred.

I claim:

1. In combination, an oil sealed rotary vane type compressor, a separate container for the gas discharged by said compressor and for sealing oil, a fluid carrying connection between the discharge of said compressor and said container, a non-return valve in said connection, an oil supply conduit from said container to said compressor, a cylinder in communication at one end with said fluid carrying connection between the compressor discharge and said non-return valve and at the other end to said oil supply conduit, a valve in said oil supply conduit and controlling oil flow to said compressor, and a piston operative within said cylinder and operatively connected to said valve, whereby movement of said piston under the influence of pressure generated by the compressor on starting opens said valve to permit a flow of sealing oil and movement of said piston under the influence of residual pressure in said container on stopping said compressor closes said valve to shut off said flow of sealing oil.

2. The combination of claim 1 wherein said piston and said valve are located within the casing of the compressor.

3. The combination of claim 1 including a compression spring in said cylinder and bearing upon said piston to urge it in the direction to open said valve.

4. The combination of claim 1 wherein said valve is constituted by a ball co-operating with a seat.

THOMAS WINTER NICHOLS.

References Cited in the file of this patent

UNITED STATES PATENTS

| Number | Name | Date |
| --- | --- | --- |
| 1,686,569 | McMillan | Oct. 9, 1928 |
| 1,720,310 | Wilcox | July 9, 1929 |
| 1,969,999 | Cuthbert | Aug. 14, 1934 |
| 2,264,616 | Buckbee | Dec. 2, 1941 |
| 2,285,426 | Freeman | June 9, 1942 |

FOREIGN PATENTS

| Number | Country | Date |
| --- | --- | --- |
| 559,948 | Germany | Sept. 8, 1932 |